(12) United States Patent
Vee et al.

(10) Patent No.: US 7,890,494 B2
(45) Date of Patent: Feb. 15, 2011

(54) SYSTEM AND/OR METHOD FOR PROCESSING EVENTS

(75) Inventors: Erik N. Vee, San Jose, CA (US); Minos Garofalakis, San Francisco, CA (US); Jayavel Shanmugasundaram, Santa Clara, CA (US); Ashwin Kumar V Machanavajjhala, Ithaca, NY (US)

(73) Assignee: Yahoo! Inc., Sunnyvale, CA (US)

( * ) Notice: Subject to any disclaimer, the term of this patent is extended or adjusted under 35 U.S.C. 154(b) by 733 days.

(21) Appl. No.: 11/932,928

(22) Filed: Oct. 31, 2007

(65) Prior Publication Data

US 2009/0112846 A1     Apr. 30, 2009

(51) Int. Cl.
*G06F 17/30* (2006.01)
(52) U.S. Cl. .................. 707/713; 707/715; 707/718; 707/736; 707/755
(58) Field of Classification Search .......... 707/713, 707/715, 718, 736, 755
See application file for complete search history.

(56) References Cited

U.S. PATENT DOCUMENTS

| | | | |
|---|---|---|---|
| 5,727,196 A * | 3/1998 | Strauss et al. ............. 707/713 |
| 6,253,195 B1 * | 6/2001 | Hudis et al. .............. 707/713 |
| 6,633,860 B1 * | 10/2003 | Afek et al. ........... 707/E17.012 |
| 6,757,686 B1 * | 6/2004 | Syeda-Mahmood et al. ............. 707/999.003 |
| 6,959,304 B1 * | 10/2005 | Teig et al. ............... 707/713 |
| 7,177,854 B2 * | 2/2007 | Chun et al. .............. 707/715 |
| 2003/0033300 A1 * | 2/2003 | Bergman et al. ............. 707/5 |
| 2003/0093415 A1 * | 5/2003 | Larson et al. ............... 707/3 |
| 2003/0154189 A1 * | 8/2003 | Egilsson et al. ............. 707/1 |
| 2004/0044622 A1 * | 3/2004 | Blott et al. ................ 705/40 |
| 2004/0044659 A1 * | 3/2004 | Judd et al. ................. 707/3 |
| 2005/0050060 A1 * | 3/2005 | Damm et al. ............ 707/100 |
| 2005/0091208 A1 * | 4/2005 | Larson et al. ............... 707/3 |
| 2007/0250476 A1 * | 10/2007 | Krasnik .................... 707/2 |
| 2009/0182706 A1 * | 7/2009 | Olston et al. ............... 707/2 |
| 2009/0319518 A1 * | 12/2009 | Koudas et al. ............. 707/5 |
| 2010/0161614 A1 * | 6/2010 | Choi et al. ............... 707/741 |
| 2010/0211572 A1 * | 8/2010 | Beyer et al. ............. 707/742 |

OTHER PUBLICATIONS

Jiang et. al., XR-Tree: Indexing XML Data for Efficient Structural Joins, Aug. 16, 2002, pp. 1-12.*
Lin et. al., Stabbing the Sky: Efficient Skyline Computation over Sliding Windows, Nov. 27, 2004, pp. 1-12.*
Datta et. al., A Note on the IP Table Lookup Problem, Dec. 10, 2004, pp. 1-17.*
Chaabouni et. al., The Point-Range Tree: A Data Structure for Indexing Intervals, 1993, pp. 1-8.*
Kamel et. al., Hilbert R-tree: An Improved R-tree Using Fractals, 1994, pp. 1-10.*
Agarwal et. al., An Optimal Dynamic Interval Stabbing-Max Data Structure?, Oct. 24, 2004, pp. 1-10.*
Vigneron, "Segment trees and interval trees", Lecture 5, CS 4235, National University of Singapore, Feb. 13, 2004.

* cited by examiner

*Primary Examiner*—Charles Rones
*Assistant Examiner*—Rezwanul Mahmood
(74) *Attorney, Agent, or Firm*—Berkeley Law & Technology Group, LLP (57) ABSTRACT

The subject matter disclosed herein relates to processing information regarding events. In one particular example, a stabbing query may be formulated in response to an event. One or more sets are associated with and/or mapped to nodes of a tree.

23 Claims, 6 Drawing Sheets

SYSTEM AND/OR METHOD FOR PROCESSING EVENTS

BACKGROUND

1. Field

The subject matter disclosed herein relates to processing events.

2. Information

The publish/subscribe ("pub/sub") paradigm in which a large population of users expresses long-term interests ("subscriptions") over streams of "published events" has gained immense popularity in recent years, at least in part due to the availability of increasing volumes of dynamic information available over the worldwide web such as, or example, stock quotes and news reports. A pub/sub engine typically matches an incoming event to a subset of standing subscriptions. For example, streams of event messages originating at one or more "publishers" may be matched with the interests of one or more pre-registered "subscribers.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "associating", "identifying", "determining" and/or the like refer to the actions and/or processes of a computing platform, such as a computer or a similar electronic computing device, that manipulates and/or transforms data represented as physical electronic and/or magnetic quantities within the computing platform's memories, registers, and/or other information storage, transmission, and/or display devices.

Embodiments described herein relate to, among other things, processing information associated with an event. In one particular embodiment, although claimed subject matter is not limited in this respect, such information may relate to and/or be descriptive of any one of several events such as, for example, a "publication" generated by a publisher (e.g., data producer). Such a publication may comprise information that is available for distribution to one or more subscribers (e.g., data consumers) having established "subscriptions".

In one particular example, a publication may comprise information associated with a consumer's selection of a web page from a network browser. Such a publication may include information such as, for example, a profile associated with the consumer such as, for example, age, gender, geographical location, browsing habits and purchasing behavior just to name a few examples. Based upon such information, one or more advertising parties as subscribers may desire to present one or more banner advertisements to the consumer during a browsing session, for example. Accordingly, such an advertising party may establish subscriptions with a website operator and/or Internet service provider to conditionally present a banner advertisement to the consumer based, at least in part, on information provided in a publication associated with the consumer.

In another example, a publication may comprise information associated with a financial transaction regarding a tradable unit and/or expression of desire to enter into a financial transaction such as bid or ask on an electronic exchange. Subscribers may comprise parties that are interested in monitoring trading activity associated with the particular tradable unit. Such a subscription may comprise a conditional course of action in connection with the tradable unit connection to be taken in response to receipt of a publication providing certain information (e.g., sell if a published bid price exceeds a specified value or buy if a published ask price is below a specified value). It should be understood, however, that these are merely examples of publications and subscriptions according to particular embodiments and that claimed subject matter is not limited in this respect.

According to an embodiment, a subscription may be represented by a set of elements associated with events of interest. Accordingly, as part of processing a published event, such an event may be compared with at least a portion of a set representing a subscription to find a match. In a particular example, without loss of generality, such a set may be defined and/or represented by a one-dimensional interval and/or segment. In alternative embodiments, such a set may be defined by a multi-dimensional space characterizing events to be associated with a particular subscription. However, these are merely examples of sets which may characterize events associated with a subscription and claimed subject matter is not limited in this respect.

According to an embodiment, published events may be processed by a comparison of data representing such events with hierarchical information expressed and/or represented in one or more "trees." Here, a tree may express and/or represent such hierarchical information in any one of several forms such as, for example, a computer accessible memory. As such, it should be understood that information in such a tree may be accessed and/or manipulated by a computing platform. Also, it should be understood that a tree may be expressed and/or represented by any one of several formats such as, for example, as an XML document.

In one particular example where a tree comprises information represented as digital signals stored in a computer accessible memory as part of a computing platform, such a tree may be accessed by one or more processes executed on a computing platform to provide one or more useful and tangible results such as, for example, processing information relating to an event and/or publication as in particular examples illustrated herein.

In a particular embodiment, and for the purpose of ease of explanation, information in a tree may be expressed as a finite, rooted, connected, acyclic graph. This is illustrated, for example, in FIG. 1 by tree embodiment 100. As illustrated, tree embodiment 100 comprises a root node 102 connected to other nodes by edges 104. Nodes in tree embodiment 100 may represent pieces information which are hierarchically associated with one another through branches or edges 104. In this context, one or more nodes of tree embodiment 100 may be associated with a subscription.

Figure 1:
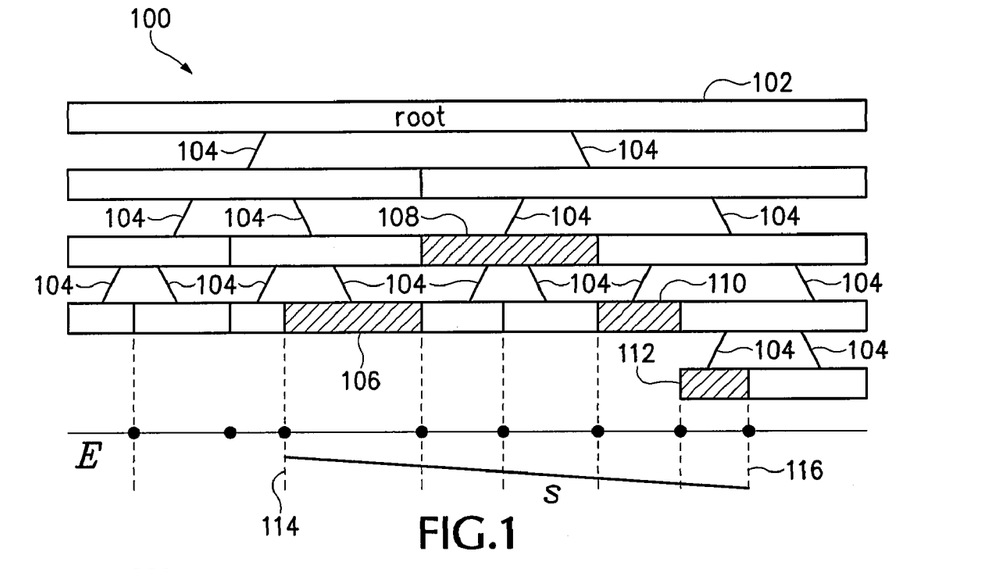
FIG. 1 is a schematic diagram of a tree comprising nodes associated with a set according to an embodiment.

According to an embodiment, nodes of tree embodiment 100 may be associated with sets represented as segments and/or intervals. For example, root node 102 may be associated with a universe of values (e.g., a range over the set of real numbers, integers, etc.) that may be associated with a published event. Such a universe of values is partitioned among nodes which are direct descendents of root node 102. Likewise, a parent node in tree 100 is associated with range of values while each child of the parent node is associated a portion of that range divided and allocated among sibling nodes as shown. As illustrated in FIG. 1, such portions of that range associated with sibling children nodes of the parent node are mutually exclusive (e.g., non-overlapping) and exhaustively complete over the range associated with the parent node.

Referring again to the particular example of FIG. 1, segment s may represent a subscription associated with a set comprising an interval of real numbers between bounds or endpoints 114 and 116. Here, segment s may represent any range of values relevant to an event such as, for example, age, price or quantity, just to name a few examples. For example, an event that is associated with a subscription represented as segment s may be defined by a value that is within such a range of values. According to an embodiment, elements of a set representing a subscription may be allocated among and/or partitioned into distinct subsets to be associated with nodes of a tree. As illustrated in FIG. 1, distinct and non-overlapping portions of a subscription represented by segment s are mapped and/or allocated to nodes 106, 108 110 and 104 of tree embodiment 100. Accordingly, an event associated with a subscription represented by segment s (e.g., where the event is represented by a value within a range defined by segment s) may be associated with one of the nodes 104, 106, 108 and 110. For example, if the event is represented by a value within the portion of segment s mapped to and/or associated with node 106, the event is associated with node 106.

Figure 2:
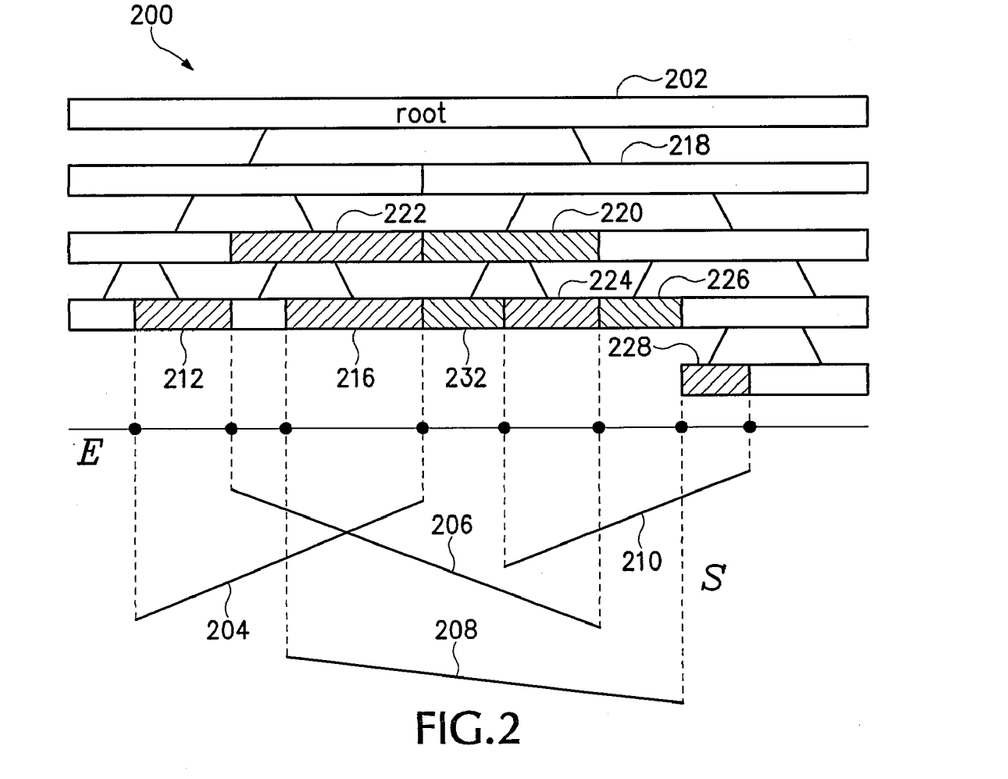
FIG. 2 is a schematic diagram of a tree comprising nodes associated with multiple sets according to an embodiment.

FIG. 2 is a schematic diagram of a tree embodiment 200 comprising nodes associated with multiple sets according to an embodiment. Here, for example, multiple subscriptions may be associated with different sets, represented by different segments 204, 206, 208 and 210 in this particular embodiment, where each segment covers a different portion of a range of values associated with root node 202. In a manner as illustrated above with reference to FIG. 1, ranges of values covered by segments 204, 206, 208 and 210 may be partitioned and mapped and/or allocated among nodes in tree 200. In this particular example, portions of the range defined by segment 210 are mapped and/or allocated among nodes 224, 226 and 228, portions of segment 208 are mapped and/or allocated among nodes 216, 220 and 226, portions of segment 206 are mapped and/or allocated among nodes 222 and 220, and portions of segment 204 are mapped and/or allocated among nodes 212 and 222.

As illustrated in the particular example of FIG. 2, a node in tree embodiment 200 may be associated with portions of multiple segments. In the particular embodiment where segments 204, 206, 208 and 210 are associated with different subscriptions, therefore, a node in tree 200 may be associated with portions of ranges associated with multiple subscriptions. For example, node 222, having been allocated and/or mapped to a portion of a range from segment 204 and a portion of a range from segment 206, may be associated with subscriptions represented by these segments.

According to an embodiment, a set, representing a subscription for example, may be associated with a score. Such a score may be determined, for example, based on any one of several scoring functions such as a cost or value function. Likewise, different sets representing different subscriptions may be associated with different scores according to a scoring function. In a particular example where a subscription relates to an advertising banner on a web page, such a subscription may be associated with a score which is based on revenue which is generated from display of the banner. However, this is merely one example of a score that may be associated with a subscription and/or associated set, and claimed subject matter is not limited in this respect.

Using a scoring function as illustrated above, an association of a published event with a subscription may be scored based, at least in part, on a score associated with the subscription according to the scoring function. Here, for example, association of a published event with a first subscription may result in a higher score than association of the published event with a second subscription if the first subscription is associated with a higher score than is the second subscription according to a scoring function. Returning to tree embodiment 200 of FIG. 2, sets associated with different segments 204, 206, 208 and 210 may be associated with different scores according to a scoring function. Accordingly, an association of a published event with one of these segments may provide a higher score than an association of the published event with a different segment.

As pointed out above, a node in tree embodiment 200 may be associated with multiple segments. For example, node 222 is associated with segments 204 and 206. In an embodiment where a published event may be associated with either segment 204 or 206, but not both, it may be desirable to "select" the segment associated with the highest score according to a scoring function.

Figure 3:
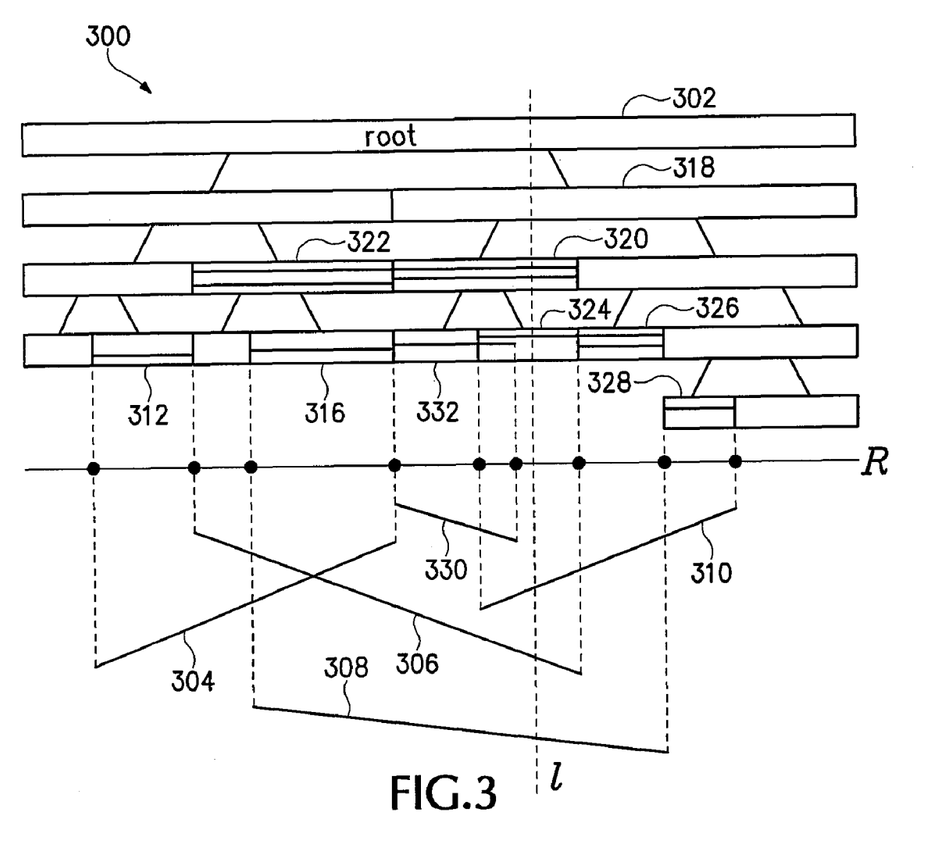
FIG. 3 is a schematic diagram of a tree in relation to a stabbing query according to an embodiment.

FIG. 3 is a schematic diagram of a tree embodiment 300 in relation to a "stabbing query" l according to an embodiment. Here, a stabbing query l may represent and/or be generated in response to a published event. In this context, a stabbing query comprises a query to identify which, if any, of a plurality of sets are associated with a particular piece of information. In a particular example, although claimed subject matter is not limited in this respect, a stabbing query may seek to identify which of a plurality of segments of real numbers contain a specific real number. In other examples as illustrated above, a stabbing query may seek to determine which segments of age, price or quantity include a particular age, price or quantity. In a particular implementation, a stabbing query may comprise and/or be represented by a digital signal that is capable of being stored in a memory and processed and/or manipulated by a computing platform using one or more techniques illustrated herein.

As illustrated above in FIG. 3, portions of segments 304, 306, 308 and 310 are associated with nodes in tree embodiment 300. For example, one portion of segment 306 is associated with node 322 while another portion is associated with node 320. As illustrated in FIG. 3, nodes 320, 320 and 326 are associated with portions of more than one segment. According to an embodiment, as a segment or portion of a segment may be associated with a set or range of values, a node may similarly be associated with a set or range of values. In one particular embodiment, stabbing query l may seek to identify which nodes of tree embodiment 300 include a particular value within ranges of values associated with the nodes or is otherwise "stabbed" by the particular value. As illustrated in FIG. 3, stabbing query l intersects nodes 302, 318, 320 and 324. Accordingly, segments associated with nodes 320 and 324 may similarly be stabbed by stabbing query l. As can be seen from this particular example, stabbing query l stabs portions of segments 306 and 308 (which are allocated to stabbed node 320) and a portion of segment 310 (which is allocated to stabbed node 324).

According to an embodiment, although claimed subject matter is not limited in this respect, a stabbing query need not seek to select all sets and/or segments that are stabbed. For simplicity in illustration, FIG. 3 shows only four segments which may be stabbed by a stabbing query. In other embodiments, many more sets and/or segments may be stabbed by a stabbing query. Here, there may be a desire to limit a number of selected sets to a set number such as, for example, the highest scoring sets from among a plurality of candidate sets. Accordingly, computationally efficient methods and/or processes for selecting such highest scoring sets and/or segments may be applied.

As shown in FIG. 3, if a portion of segment 304, 306, 308 or 310 is mapped and/or allocated to a node, the allocated portion takes the entire range of the node. With segment 304, for example, one portion is allocated to, and takes up the entire range of node 312, and a second portion of segment 304 is allocated to, and takes up the entire range of node 322. No portion of segment 304 is allocated to an incomplete portion of a node. By having allocated portions of a segment take up an entire range of a node, more numerous nodes covering smaller ranges may be employed. It should be understood, however, that implementing such a scheme with more numerous nodes covering smaller ranges may require usage of additional computational resources such as memory. In this particular allocation of segments to nodes, it can be seen that if a node is stabbed by a stabbing query, all sets and/or segments associated with the stabbed node are also stabbed by the stabbing query.

Alternatively, a portion of a segment allocated to a node may be allowed to cover less than the entire range of values covered by the node. As shown in FIG. 3, for example, a first portion of segment 330 is allocated to cover the entire range of node 332 while a second portion of segment 330 is allocated to cover less than the entire range of node 324. Here, while stabbing query l stabs node 324, it should be observed that stabbing query l does not stab segment 330, even though a portion of segment 330 has been allocated to node 324. Accordingly, if a stabbing query stabs a particular node, additional information may be needed to determine whether the stabbing query also stabs a segment allocated to the node.

Figure 4A:
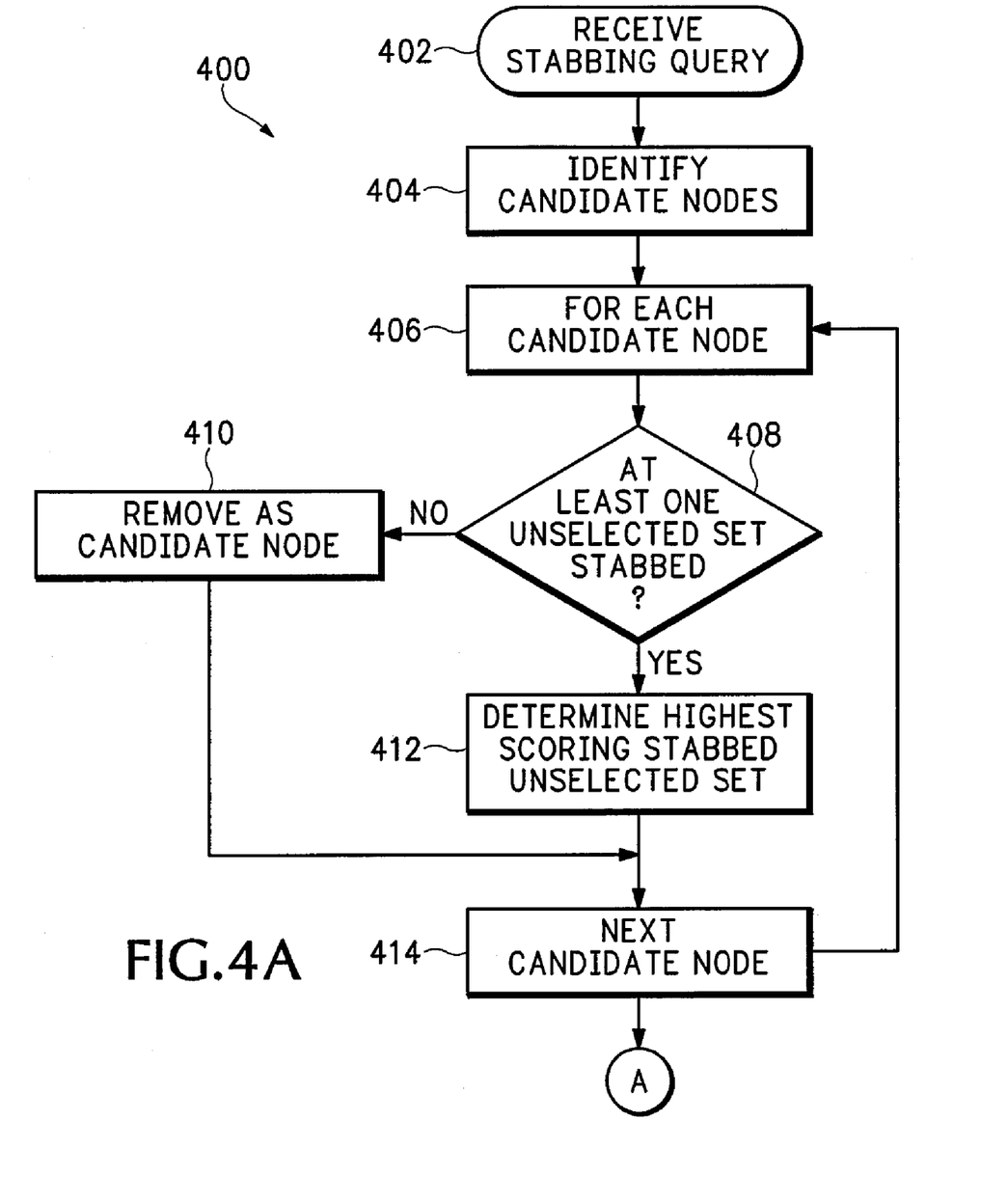
FIGS. 4A and 4B are flow diagrams of a process to associate a stabbing query with one or more sets according to an embodiment.
Figure 4B:
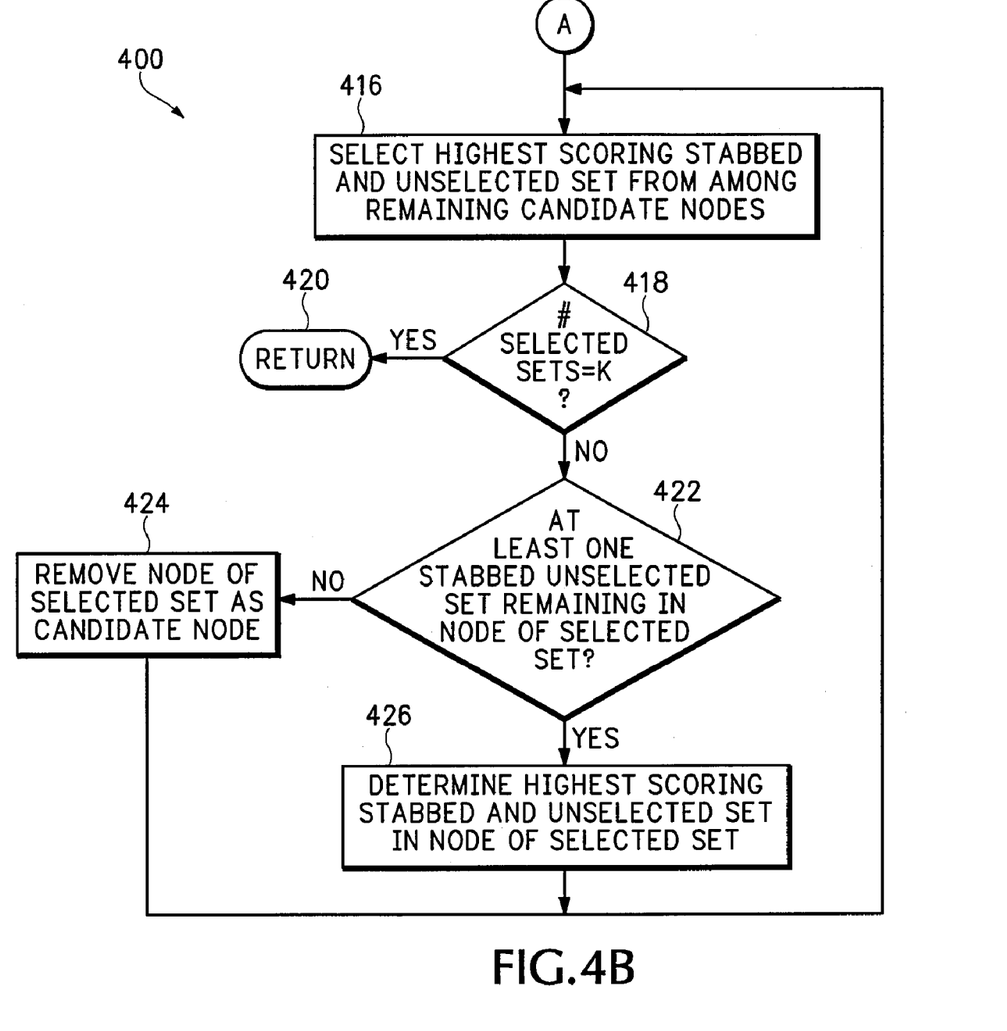

FIGS. 4A and 4B are a flow diagram of a process 400 to associate a stabbing query with one or more sets according to an embodiment. While process 400 is illustrated as a sequence of processing stages, it should be understood that blocks in process 400 are not necessarily required to execute in any particular order, and that claimed subject matter is not limited to any order of execution. A stabbing query 402 may be formulated in response to any one of several events such as, for example, publication of information. Process 400 may be adapted to associate published information with subscriptions that are associated with sets as illustrated above. In a particular embodiment, although claimed subject matter is not limited in this respect, such sets may be mapped to nodes of a tree. As illustrated above, such sets may be represented as segments defining, for example, a range of values and, similarly, nodes of a tree are associated with ranges of values. Additionally, as illustrated above, a portion of a segment allocated to a node of a tree, need not extend or cover the entire range associated with the node. As such, if a stabbing query stabs a node in a tree, additional information may needed to determine whether a set and/or segment mapped to the node is also stabbed by the stabbing query. Accordingly, in this context, a node of a tree stabbed by a stabbing query may be referred to as a "candidate node."

Also, as illustrated above, there may be numerous sets and/or segments that may potentially be stabbed by a stabbing query, but identification of a much smaller number of stabbed sets and/or segments may be desired. Accordingly, identifying more than a desired number of stabbed sets and/or segments may result in inefficient use of processing resources. As illustrated below, process 400 may limit a number of identified stabbed sets and/or segments to a selected k number of such stabbed sets and/or segments. Where such sets and/or segments are associated with a score according to a scoring function, process 400 may select the k highest scoring sets and/or segments which are stabbed by a stabbing query.

Block 404 may determine candidate nodes as being associated with a set and/or segment which is stabbed by stabbing query 402. Referring to the particular example, of FIG. 3 for purposes of illustration, such candidate nodes may comprise nodes which are stabbed by stabbing query l. Here, such nodes may include nodes 302, 318, 320 and 324. It should be observed, however, that no portions of any segment are allocated and/or mapped to nodes 302 or 318. Alternatively, candidate nodes identified at block 404 may be limited to nodes having been allocated and/or mapped to a portion of at least one segment, here nodes 320 and 324.

Any one of several tree structures may be used to express hierarchical information for processing a stabbing query. In one particular embodiment, sets and/or segments (e.g., associated with a subscription) may be associated with nodes of an interval tree using well known techniques such as those described in a slide presentation by Antoine Vigneron, "Segment Trees and Interval Trees," Lecture 5, INRA. Such an interval tree may be constructed recursively over a collection of intervals over a range of interest. Without belaboring the discussion, block 404 may identify such candidate nodes of an interval tree in response to a stabbing query using techniques known to those of ordinary skill in the art.

In an alternative embodiment, sets and/or segments may be expressed as nodes of a segment tree comprising disjoint and atomic segments, where such segments are related to one another using a balanced binary-tree structure as illustrated in the aforementioned Vigneron presentation. Here, at each level in a segment tree, a stabbing query may stab exactly one node. Thus, at block 404, starting at a root node, a path of stabbed nodes is followed to a leaf node, such that indices of the stabbed nodes are associated with candidate nodes.

Following selection of a particular segment and/or set, process 400 need not subsequently determine whether the selected segment and/or set is stabbed by a stabbing query. Accordingly, iterations of diamond 408 may determine which candidate nodes identified at block 404 include at least one unselected stabbed segment and/or set. If a candidate node contains no such unselected set and/or segment, the candidate node is removed as a candidate node at block 410. Otherwise, block 412 determines the highest scoring stabbed set in the candidate node that has not been selected.

From among unselected sets and/or segments stabbed by the stabbing query identified in blocks 406 through 414, block 416 selects the highest scoring unselected set and/or segment. If the number of selected sets and/or segments reaches a desired specified number of sets and/or segments k, as determined at diamond 418, process 400 may terminate. Here, accordingly, process 400 may identify the k highest scoring sets and/or segments which are stabbed by a stabbing query.

Following selection of a set and/or segment from a remaining candidate node at block 416, if the remaining candidate node is associated with any remaining unselected sets and/or segments which stabbed by the stabbing query, as determined at diamond 422, block 426 may determine the highest scoring stabbed and unselected set and/or segment associated with the node of the selected set. Block 416 may then consider this stabbed set and/or segment, along with other stabbed and unselected sets and/or segments associated with other candidate nodes, in select a next highest scoring stabbed and unselected set.

As illustrated above, for a candidate node, processing at diamond 408 and block 412 may identifying a highest scoring unselected segment and/or set mapped and/or allocated to the candidate node. For example, a sets and/or segments associated with a candidate node may be organized hierarchically in a tree, for example, permitting efficient determination of a highest scoring stabbed and unselected segment and/or set associated with the candidate node. Here, such a tree may comprise an "R-tree", segment tree or an interval tree. However, these are merely examples of types of trees that may be implemented for organizing sets and/or segments associated with a candidate node and claimed subject matter is not limited in this respect.

Figure 5:
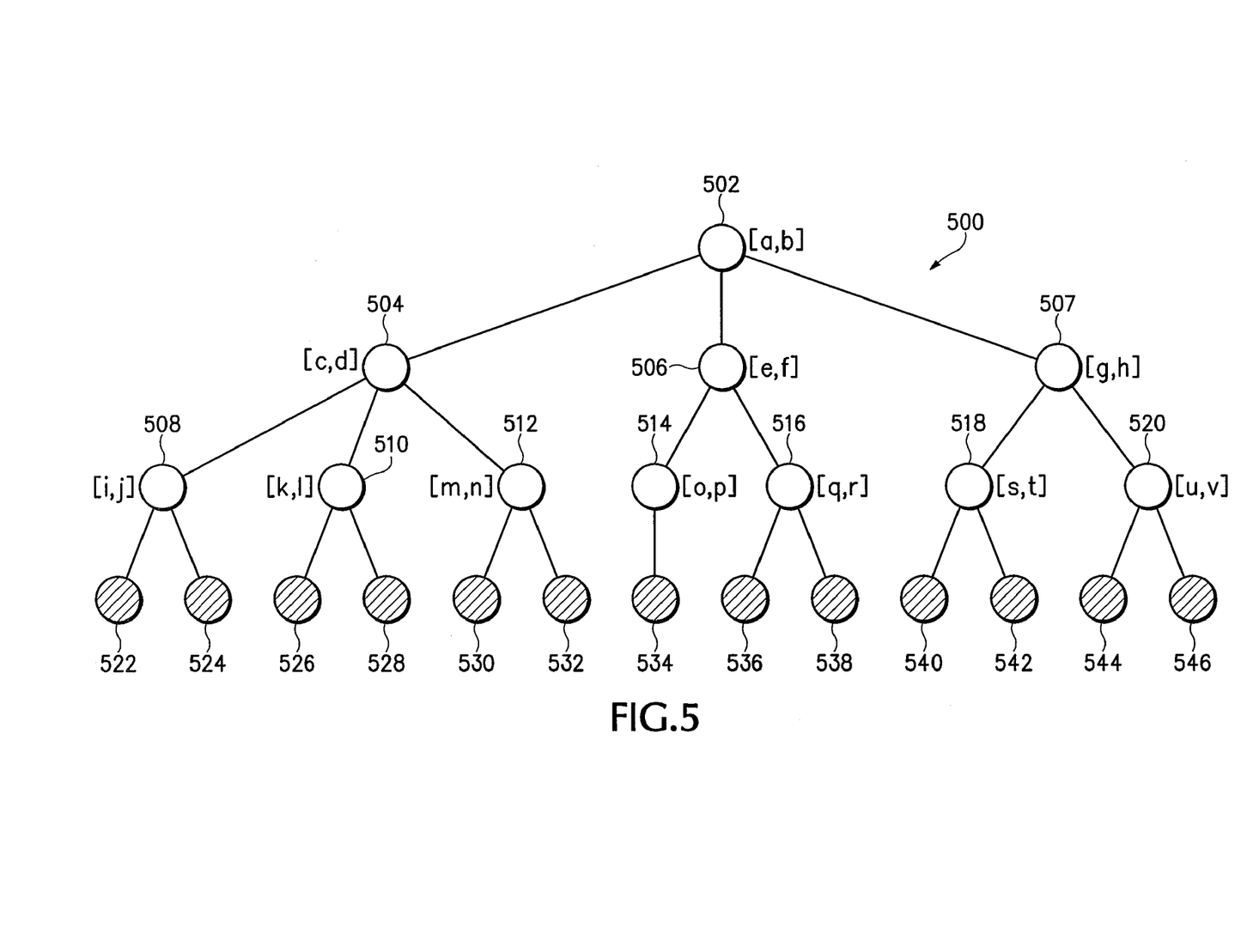
FIG. 5 is a schematic diagram of a tree for illustrating a process for identifying a highest scoring unselected set associated with a stabbing query.

In a particular embodiment, such a highest scoring unselected segment and/or set may be identified in a process illustrated below with reference to FIG. 5. As illustrated here, tree embodiment 500 comprises an "R-tree". However, this merely one example of a particular structure that may be used for organizing sets and/or segments associated with a node of a larger tree, and claimed subject matter is not limited in this respect. Here, tree embodiment 500 comprises leaf nodes 522 through 546 represent portions of segments and/or sets that are mapped and/or allocated to a node of a larger tree such as tree embodiment 300 shown in FIG. 3. Here, each leaf node may represent a portion of a set and/or segment that is mapped and/or allocated to a node in the larger tree (e.g., a node in tree embodiment 200 or 300). As illustrated herein according to a particular embodiment, if the node in the larger tree is stabbed by a stabbing query (e.g., stabbing query 1), nodes of tree embodiment 500 may be traversed to identify a highest scoring unselected set and/or segment associated with the stabbed node.

In the presently illustrated embodiment, root node 502 is associated with a range of values such as an interval of real numbers in a range [a, b]. Here, such a range may be the same as and/or based upon a range associated with a stabbed node in a larger tree. Intermediate nodes are similarly associated with a range as shown. Such a range associated with an intermediate node comprises a subset or sub portion of the range associated with its parent node. For example, ranges [c, d,] [e,f] and [g, h], associated with nodes 504, 506 and 507, respectively, are each subsets of the range [a, b] associated with root node 502. Likewise, ranges [i,j], [k, l] and [m, n], associated with nodes 508, 510 and 512, respectively, are each subsets of the range [c, d] associated with intermediate node 504.

Tree embodiment 500 may comprise an ordered tree in that leaf nodes 522 through 546 represent portions of sets and/or segments ranked from a highest scoring segment and/or set (e.g., represented by leaf node 522) to a lowest scoring segment and/or set (e.g., represented by leaf node 546). To locate a highest scoring stabbed unselected set in response to a stabbing query, nodes of tree embodiment 500 may be traversed until a left most leaf node associated with an unselected segment and/or set is located. In response to a stabbing query within range [a, b], a leftmost child of root node associated with a range stabbed by the stabbing query is selected. For example, if the stabbing query is within range [c, d], the stabbing query may traverse from root node 502 to intermediate node 504. However, if the stabbing query is not within range [c, d] but is within range [e,j] associated with intermediate node 506, the stabbing query may traverse from root node 502 to intermediate node 506 instead (here, node 506 being left of intermediate node 507). If the stabbing query traverses to intermediate node 504, the stabbing query may similarly traverse to either node 508, 510 or 512, depending on a leftmost range of ranges [i, j], [k,l] and [m, n] which is stabbed by the stabbing query.

If the stabbing query then traverses to a parent of a leaf node, accordingly, it can be determined that the stabbing query stabs segments and/or sets that are associated leaf node children of the parent. Here, a leftmost child leaf node associated with an unselected set and/or segment may then be identified as the highest scoring stabbed and unselected set and/or segment associated with a node of a larger tree (e.g., at block 412). By ordering tree embodiment 500 such that leaf nodes 522 through 546 are associated with sets and/or segments from highest scoring to lowest scoring from left to right, and traversing the stabbing query to leftmost intermediate nodes, it may be ensured that a traversed leaf node is associated with a highest scoring set and/or segment allocated and/or mapped to the node in the larger tree and that is stabbed by the stabbing query.

In one particular embodiment, ranges of child nodes of a parent node in tree embodiment 500 may not cover the entire range of the parent node. For example, a union of ranges [i,j], [k, l ] and [m, n], associated with child nodes 508, 510 and 512, respectively, may not cover the entirety of the range [c, d] associated with parent node 504. Here, if a stabbing query traverses node 504 (e.g., by being associated with a value in the range [c, d]) but does not stab nodes 508, 510 or 512 (by not being associated with a value in any of the ranges [i,j], [k, l] and [m, n]), the next left-most child node of root node 502, node 506, is traversed. Here, a leaf node descending from the next left-most child of root node 502 may be selected as being associated with the highest scoring stabbed set and/or segment in a candidate node as illustrated above.

To associate a stabbing query with a set and/or segment, a stabbing query may stab a parent of one of the leaf nodes by, for example, being associated with a value within a range that is associated with the parent node. In a particular embodiment, a stabbing query that stabs node 502 (e.g., is associated with a value between [a, b]) need not stab a parent of a leaf node. For example, the union of ranges [i,j], [k, l], [m, n], [o, p], [q, r], [s, t] and [a, v], associated with parent nodes 508, 510, 512, 514, 516, 518 and 520, respectively, may not include the entire range of [a, b]. Similarly, as illustrated above in connection with tree embodiment 300 shown in FIG. 3, a portion of a segment mapped to and/or allocated to a node (e.g., node 324 as shown) need not cover the entire range covered by the node. Accordingly, it is possible for a stabbing query associated with a value in range [a, b] not stab any set and/or segment associated with a leaf node. Here, this allows the allocation and/or mapping of portions of sets and/or segments to a node of a larger tree (e.g., tree embodiment 300) that do not extend the entire range of values associated with the node. Again, this may simplify memory requirements for storing large trees for use in processing stabbing queries.

Figure 6:
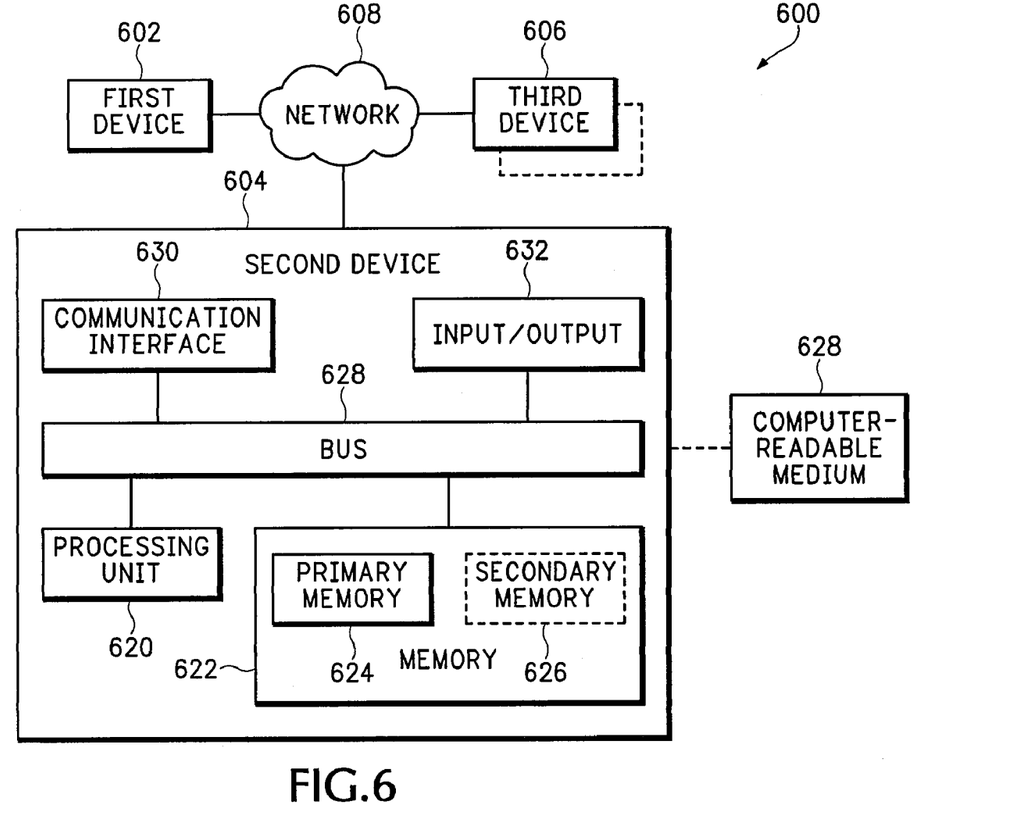
FIG. 6 is a schematic diagram an exemplary embodiment of a computing environment system having one or more devices configurable to process a stabbing query.

FIG. 6 is a schematic diagram illustrating an exemplary embodiment of a computing environment system 600 that may include one or more devices configurable to process a stabbing and/or information regarding publication of an event using one or more techniques illustrated above, for example. System 600 may include, for example, a first device 602, a second device 604 and a third device 606, which may be operatively coupled together through a network 608.

First device 602, second device 604 and third device 606, as shown in FIG. 6, may be representative of any device, appliance or machine that may be configurable to exchange data over network 608. By way of example but not limitation, any of first device 602, second device 604, or third device 606 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 608, as shown in FIG. 6, is representative of one or more communication links, processes, and/or resources configurable to support the exchange of data between at least two of first device 602, second device 604, and third device 606. By way of example but not limitation, network 608 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 606, there may be additional like devices operatively coupled to network 608.

It is recognized that all or part of the various devices and networks shown in system 600, and the processes and methods as further described herein, may be implemented using or otherwise include hardware, firmware, software, or any combination thereof.

Thus, by way of example but not limitation, second device 604 may include at least one processing unit 620 that is operatively coupled to a memory 622 through a bus 628.

Processing unit 620 is representative of one or more circuits configurable to perform at least a portion of a data computing procedure or process. By way of example but not limitation, processing unit 620 may include one or more processors, controllers, microprocessors, microcontrollers, application specific integrated circuits, digital signal processors, programmable logic devices, field programmable gate arrays, and the like, or any combination thereof.

Memory 622 is representative of any data storage mechanism. Memory 622 may include, for example, a primary memory 624 and/or a secondary memory 626. Primary memory 624 may include, for example, a random access memory, read only memory, etc. While illustrated in this example as being separate from processing unit 620, it should be understood that all or part of primary memory 624 may be provided within or otherwise co-located/coupled with processing unit 620.

Secondary memory 626 may include, for example, the same or similar type of memory as primary memory and/or one or more data storage devices or systems, such as, for example, a disk drive, an optical disc drive, a tape drive, a solid state memory drive, etc. In certain implementations, secondary memory 626 may be operatively receptive of, or otherwise configurable to couple to, a computer-readable medium 628. Computer-readable medium 628 may include, for example, any medium that can carry and/or make accessible data, code and/or instructions for one or more of the devices in system 600.

Second device 604 may include, for example, a communication interface 630 that provides for or otherwise supports the operative coupling of second device 604 to at least network 608. By way of example but not limitation, communication interface 630 may include a network interface device or card, a modem, a router, a switch, a transceiver, and the like.

Second device 604 may include, for example, an input/output 632. Input/output 632 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 632 may include an operatively configured display, speaker, keyboard, mouse, trackball, touch screen, data port, etc.

With regard to system 600, in certain implementations first device 602 may be configurable, to transmit information regarding an event to second device 604 by providing or otherwise identifying a publication that second device 604 may then process. For example, one such event may relate to any one of several types of published events described above according to particular embodiments. In response to such a publication, for example, second device 604 may then process a stabbing query using one or more techniques illustrated above.

Here, for example, to process such a stabbing query second device may be configured to access stored data associated with various items that may be available within system 600 and which may be of interest or otherwise associated with information included within the stabbing query. The stored data may, for example, one or more trees.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method of processing a stabbing query comprising:
obtaining a signal representative of said stabbing query;
identifying nodes in a tree, said tree being stored in a memory, each of a plurality of sets being associated with one or more nodes of said tree, which are candidate nodes for being associated with at least one set which is stabbed by said stabbing query, each of said sets being associated with a score;
for at least one of said candidate nodes, determining whether at least one unselected one of said sets associated with said candidate node is stabbed by said stabbing query and, if said at least one of said unselected sets associated said candidate node is stabbed by said stabbing query, determining a highest scoring unselected set associated with said candidate node which is stabbed by said stabbing query;
selecting an unselected set from among highest scoring sets associated with candidate nodes which are associated with at least one unselected set which is stabbed by said stabbing query, wherein a node is eliminated as being a candidate node if said node is not associated with an unselected set that is stabbed by said stabbing query; and
repeating said determining and said selecting until a specified number of sets are selected.

2. The method of claim 1, wherein said determining said highest scoring unselected set associated with said stabbed node further comprises maintaining a ranked list of said unselected sets based, at least in part, on said scores associated with said sets.

3. The method of claim 1, wherein said determining further comprises maintaining an R-tree associated with said stabbed node.

4. The method of claim 1, wherein said determining further comprises maintaining an interval associated with said stabbed node.

5. The method of claim 1, wherein at least one of said sets is associated with a subscription and said stabbing query is associated with a publication of information.

6. The method of claim 1, wherein said stabbing query is initiated by a user input received at a website and said selected sets are associated with advertisements to be presented in response to said user input.

7. The method of claim 6, wherein said stabbing query is based, at least in part, on one or more attributes of a user generating said user input.

8. The method of claim 1, wherein said tree comprises an interval tree and said sets comprise intervals.

9. The method of claim 1, wherein said tree comprises a segment tree.

10. The method of claim 1, and further comprising storing in a memory said determination of said highest scoring unselected set associated with said candidate node which is stabbed by said stabbing query.

11. An article comprising:
a storage medium comprising machine readable instructions stored thereon which are executable by a computing platform to:
identify nodes in a tree, each of a plurality of sets being associated with one or more nodes of said tree, which are candidate nodes for being associated with at least one set which is stabbed by a stabbing query, each of said sets being associated with a score;
for each of said candidate nodes, determine whether at least one unselected one of said sets associated with said candidate node is stabbed by said stabbing query and, if said at least one of said unselected sets associated candidate node is stabbed by said stabbing query, determine a highest scoring unselected set associated with said candidate node which is stabbed by said stabbing query;
select an unselected set from among highest scoring sets associated with candidate nodes which are associated with at least one unselected set which is stabbed by said stabbing query, wherein a node is eliminated as being a candidate node if said node is not associated with an unselected set that is stabbed by said stabbing query; and
repeat said determining and said selecting until a specified number of sets are selected.

12. An apparatus comprising:
a computing platform, said computing platform being programmed with instructions to:
(a) identify nodes in a tree stored in a memory, each of a plurality of sets being associated with one or more nodes of said tree, which are candidate nodes for being associated with at least one set which is stabbed by a stabbing query, each of said sets being associated with a score;
(b) for at least one of said candidate nodes, determine whether at least one unselected one of said sets associated with said candidate node is stabbed by said stabbing query and, if said at least one of said unselected sets associated said candidate node is stabbed by said stabbing query, determine a highest scoring unselected set associated with said candidate node which is stabbed by said stabbing query;

(c) select an unselected set from among highest scoring sets associated with candidate nodes associated with at least one unselected set which is stabbed by said stabbing query, wherein a node is eliminated as being a candidate node if said node is not associated with an unselected set that is stabbed by said stabbing query; and repeat (b) and (c) until a specified number of sets are selected.

13. The apparatus of claim 12, and further comprising a network interface device to transmit information between said computing platform and a network, and wherein said computing platform is further adapted to formulate said stabbing query based, at least in part, on information received from said network.

14. The apparatus of claim 13, wherein said received information comprises a publication of an event.

15. The apparatus of claim 12, wherein at least one set which is stabbed by said stabbing query comprises a subscription associated with said publication.

16. The apparatus of claim 12, wherein said stabbing query is initiated by a user input received at a website and said selected sets are associated with advertisements to be presented in response to said user input.

17. The apparatus of claim 16, wherein said stabbing query is based, at least in part, on one or more attributes of a user generating said user input.

18. An apparatus comprising:
   means, comprising a computing platform, for obtaining a signal representative of said stabbing query;
   means, comprising said computing platform, for identifying nodes in a tree, said tree being stored in a memory, each of a plurality of sets being associated with one or more nodes of said tree, which are candidate nodes for being associated with at least one set which is stabbed by said stabbing query, each of sets being associated with a score;
   for at least one of said candidate nodes, means, comprising said computing platform, for determining whether at least one unselected one of said sets associated with said candidate node is stabbed by said stabbing query and, if said at least one of said unselected sets associated said candidate node is stabbed by said stabbing query, determining a highest scoring unselected set associated with said candidate node which is stabbed by said stabbing query;
   means, comprising said computing platform, for selecting an unselected set from among highest scoring sets associated with candidate nodes which are associated with at least one unselected set which is stabbed by said stabbing query, wherein a node is eliminated as being a candidate node if said node is not associated with an unselected set that is stabbed by said stabbing query; and
   means, comprising said computing platform, for repeating said determining and said selecting until a specified number of sets are selected.

19. The method of claim 1, wherein said method is performed, at least in part, by a computing platform.

20. The article of claim 11, wherein at least one of said sets is associated with a subscription and said stabbing query is associated with a publication of information.

21. The article of claim 11, wherein said stabbing query is initiated by a user input received at a website and said selected sets are associated with advertisements to be presented in response to said user input.

22. The apparatus of claim 18, wherein at least one of said sets is associated with a subscription and said stabbing query is associated with a publication of information.

23. The apparatus of claim 18, wherein said stabbing query is initiated by a user input received at a website and said selected sets are associated with advertisements to be presented in response to said user input.

* * * * *